United States Patent
Zhan et al.

(10) Patent No.: US 8,702,355 B2
(45) Date of Patent: Apr. 22, 2014

(54) BENCH SLIDE DRILLING AND TAPPING DUAL-PURPOSE MACHINE TOOL

(76) Inventors: Jing Zhan, Yangzhou (CN); Feng Zhang, Yangzhou (CN)

(*) Notice: Subject to any disclaimer, the term of this patent is extended or adjusted under 35 U.S.C. 154(b) by 202 days.

(21) Appl. No.: 13/510,358

(22) PCT Filed: Jan. 11, 2011

(86) PCT No.: PCT/CN2011/070162
§ 371 (c)(1),
(2), (4) Date: May 17, 2012

(87) PCT Pub. No.: WO2012/009969
PCT Pub. Date: Jan. 26, 2012

(65) Prior Publication Data
US 2012/0219372 A1    Aug. 30, 2012

(30) Foreign Application Priority Data

Jul. 21, 2010  (CN) .......................... 2010 1 0235340

(51) Int. Cl.
*B23B 39/12*   (2006.01)

(52) U.S. Cl.
USPC .............. 408/88; 408/128; 408/130; 408/237

(58) Field of Classification Search
CPC ...... B25H 1/0042; B25H 1/005; B23B 47/26; B23B 39/12
USPC ........... 408/88, 124, 128, 130, 135, 110, 236, 408/237, 234
See application file for complete search history.

(56) References Cited

U.S. PATENT DOCUMENTS

| | | | | | |
|---|---|---|---|---|---|
| 2,176,572 | A | * | 10/1939 | Hedgpeth | 474/79 |
| 2,319,551 | A | * | 5/1943 | Linden et al. | 408/236 |
| 2,356,438 | A | * | 8/1944 | Wilson | 408/16 |
| 2,360,921 | A | * | 10/1944 | Wiken | 408/234 |
| 2,434,732 | A | * | 1/1948 | Alick | 408/241 R |
| 3,923,086 | A | * | 12/1975 | Spohn, Jr. | 144/135.3 |
| 3,975,109 | A | * | 8/1976 | Frazierr | 408/35 |
| 4,043,700 | A | * | 8/1977 | Singer | 408/237 |

FOREIGN PATENT DOCUMENTS

| | | |
|---|---|---|
| CN | 2193790 | 4/1995 |
| CN | 2511434 | 9/2002 |
| CN | 201195208 | 2/2009 |
| CN | 201728529 | 2/2011 |
| DE | 10325719 A1 | 1/2005 |
| GB | 190921297 A * | 0/1909 |

* cited by examiner

*Primary Examiner* — Daniel Howell
*Assistant Examiner* — Nicole N Ramos
(74) *Attorney, Agent, or Firm* — Rabin & Berdo, P.C.

(57) ABSTRACT

A bench slide drilling and tapping dual-purpose machine tool has a base, a column and a transverse arm sleeve. The transverse arm sleeve is sleeved around the column, which is vertically fixed on the base. A hydraulic cylinder body is arranged coaxially with the column is centered in the column. A bracket is connected to the upper end of the sleeve, and is connected to a telescopic rod of the hydraulic cylinder. A sliding track is connected to one side of the transverse arm sleeve. A sliding transverse arm is provided inside the sliding track. A main motor is provided on one end of the sliding transverse arm, and the other end of the sliding transverse arm is fixedly connected with a second transverse arm; a drilling driven shaft is arranged in the second transverse arm; the upper end of a main motor is connected with a main belt wheel.

7 Claims, 1 Drawing Sheet

BENCH SLIDE DRILLING AND TAPPING DUAL-PURPOSE MACHINE TOOL

FIELD OF THE INVENTION

The present invention relates to a manufacturing technology of drilling and tapping dual-purpose machine tool, especially to a manufacturing technology of drilling and tapping dual purpose machine tool of slide in free work position.

BACKGROUND OF THE INVENTION

The existing bench drilling and tapping machine tool usually includes a base, a column, a transverse arm and drilling and tapping device. The lower end of the column is connected to the base, and the transverse arm is horizontally connected to the column. One end of the transverse arm is connected to the column, the other end to the drilling and tapping device. The machine tool is driven through belt by the motor. It's not easy or even impossible for the above drilling and tapping device to process a workpiece fixed on the base or the different positions of the same workpiece. It needs operator holding the workpiece to process, which is unsafe and low accuracy. Moreover, as with the only belt driving, it's of easy slippery and without high pulling torque.

SUMMARY OF THE INVENTION

To solve the problem that the existing drilling and tapping dual-purpose machine tool can not realize multi-angle and multi-position processing and the problem of high labor consumption, the present invention is provided with a bench slide drilling and tapping dual-purpose machine tool.

The present invention includes a base, a column and a transverse arm sleeve, the column is vertically fixed on the base, the transverse arm sleeve is sleeved around the column, wherein the cylinder body of the hydraulic cylinder arranged coaxially with the column is provided in the center of the column; a bracket is connected to the upper end of the transverse arm sleeve, and the bracket is connected to the top end of the telescopic rod of the hydraulic cylinder; a sliding track is fixedly connected to one side of the transverse arm sleeve, and a sliding transverse arm is provided inside the sliding track, a main motor is provided on one end of the sliding transverse arm, and the other end is fixedly connected with a second transverse arm; a drilling driven shaft is arranged in the second transverse arm; an upper end of the main motor is connected with a main belt wheel, and a driven belt wheel is provided on the top end of the drilling driven shaft; the main belt wheel is connected to the driven belt wheel by a belt, a lock device is disposed between the transverse arm sleeve and the column, a lock device is disposed between the sliding track and the sliding transverse arm.

The present invention is provided that the drilling driven shaft is driven to rotate through the driving device by the main motor, realizing drilling and tapping; the lift of up and down of the hydraulic cylinder of this machine tool is provided to regulate the lift of the transverse arm sleeve, the sliding track and the sliding transverse arm. The transverse arm sleeve and the column can rotate relative to each other. By pushing or pilling the sliding transverse arm to slide forward and backward, it realizes the regulation of the distance of the drilling bit; with the rotation of right and left and sliding forward and backward of the sliding transverse arm, it realizes the drilling and tapping within an area scale. The lock devices make the transverse arm sleeve fixedly locked with the column and the sliding track with the sliding transverse arm. When the drilling or tapping is positioned, turn on the lock device, preventing the swing between the sliding transverse arm and the sliding track and between the transverse arm sleeve with the column to ensure the stability and the accuracy of this machine tool.

The machine tool is provided with a first gear and a second gear fixedly disposed in the drilling driven shaft, the second gear is situated below the first gear, a gear shaft is disposed on one side of the drilling driven shaft, a lower end of the gear shaft is fixedly connected to the second transverse arm, an upper end of the gear shaft is fixedly connected to a third gear, the first gear is engaged to the third gear, a fourth gear is disposed below the third gear, the fourth gear is fixedly connected to the gear shaft, the second gear is engaged to the fourth gear, the diameter of the first gear is smaller than that of the third gear, and the diameter of the fourth gear is smaller than that of the second gear.

The lock device of the present invention includes an oil pump, an oil pipe, two hydraulic subsection pumps, pressed blocks and a selector valve, the pressed block are separately disposed between the transverse arm and the column and between the sliding track and the sliding transverse arm, the hydraulic subsection pumps are separately disposed outside the pressed blocks, the two hydraulic subsection pumps are separately connected to the oil pump through the oil pipe, the selector valve is connected between the oil pump and the hydraulic subsection pumps.

The lock device of the present invention is hydraulic lock device. The oil is pressurized through the oil pump by the main motor, and the hydraulic subsection pumps are driven by the pressurized oil inside the oil pipe. Then the pressed blocks are pushed by the hydraulic subsection pumps to lock the transverse arm sleeve with the column and the sliding transverse arm with the sliding track. The lock is realized by the tightly holding of the pressed blocks with the column and the sliding transverse arm. The lock and release are realized by the selector valve.

The lower end of the main motor is connected to the oil pump in the present invention, the input of the oil pump is connected to a oil container, the selector valve is disposed between the oil pump and the hydraulic cylinder, the oil pump, the oil container, the selector valve and the hydraulic cylinder are connected to each other by oil pipe. The oil in the oil container is pressurized into the cylinder by the oil pump, the cylinder raises; the oil in the cylinder is sprayed to the oil container by the selector valve, then the cylinder falls. The raise and the fall of the hydraulic cylinder realize the movement of up and down of the transverse arm sleeve, the sliding track and the sliding transverse arm, that is the height regulation.

A roller is disposed between the sliding transverse arm and the sliding track. With the roller, the friction between the sliding transverse arm and the sliding track is reduce, which is of convenient to operate.

DETAILED DESCRIPTION OF THE EMBODIMENT

Figure 1:
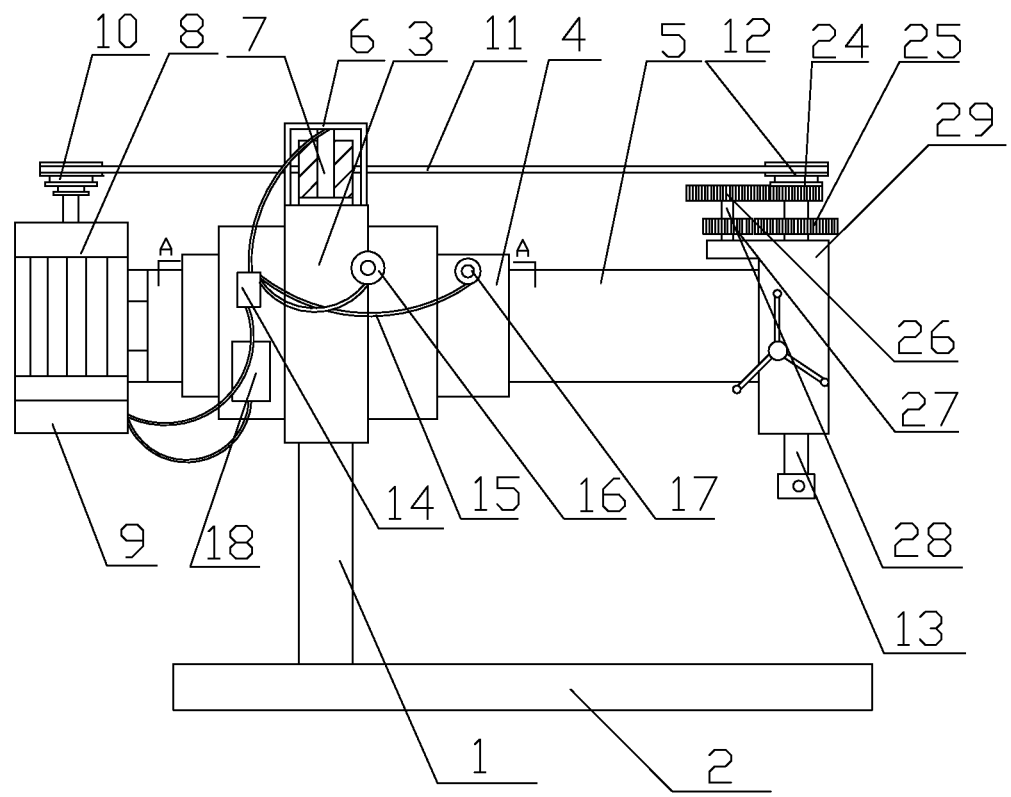
FIG. 1 illustrates the structure of the present invention.
Figure 2:
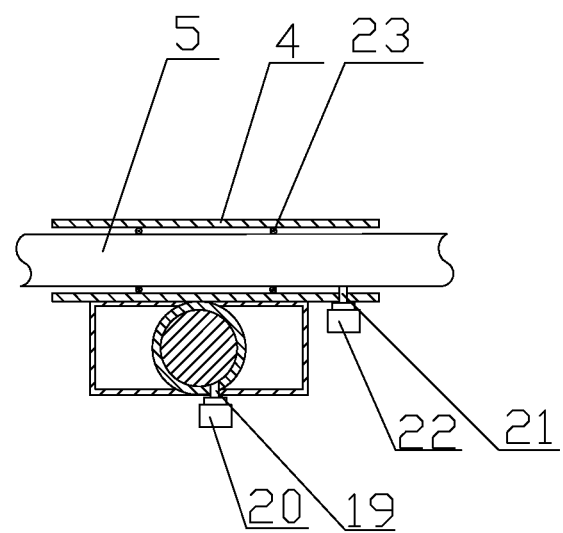
FIG. 2 illustrates the sectional view of the A-A direction.
In the figures, 1. column, 2. base, 3. transverse arm sleeve, 4. sliding track, 5. sliding transverse arm, 6. bracket, 7. hydraulic cylinder, 8. main motor, 10. main belt wheel, 11. belt, 12. driven belt wheel, 13. drilling driven shaft, 14. selector valve, 15. oil pipe, 16. lock device, 17. lock device, 18. oil container, 19. pressed block, 20. hydraulic subsection pump, 21. pressed block, 22. hydraulic subsection pump, 23. roller, 24. first gear, 25. second gear, 26. third gear, 27. forth gear, 28. gear shaft, 29. second transverse arm.

As figured in the FIG. 1 and FIG. 2, the present invention of a bench slide drilling and tapping dual purpose machine tool includes a base 2, a column 1 and a transverse arm sleeve 3, the column 1 is vertically fixed on the base 2, and the transverse arm sleeve 3 is sleeved around the column 1; the cylinder body of the hydraulic cylinder 7 arranged coaxially with the column 1 is provided in the center of the column 1; a bracket 6 is connected to the upper end of the transverse arm sleeve 3, and the bracket 6 is connected to the telescopic rod of the hydraulic cylinder 7; a sliding track 4 is fixedly connected to one side of the transverse arm sleeve 3, and a sliding transverse arm sleeve 3, and a sliding transverse arm 5 is provided inside the sliding track 4; a main motor 8 is provided on one end of the sliding transverse arm 5, and the other end of the sliding transverse arm 5 is fixedly connected with a second transverse arm 29; a drilling driven shaft 13 is arranged in the second transverse arm 29; the upper end of a main motor 8 is connected with a main belt wheel 10, and a driven belt wheel 12 is provided on the top end of the drilling driven shaft 13. The main belt wheel 10 is connected to the driven belt wheel 12 by a belt 11. A lock device 16 is disposed between the transverse arm sleeve 3 and the column 1, a lock device 17 is disposed between the sliding track 4 and the sliding transverse arm 5. The lower end of the main motor 8 is connected to the oil pump 9, the input of the oil pump 9 is connected to a oil container 18, the selector valve 14 is disposed between the oil container 18 and the hydraulic cylinder 7, the oil pump 9, the oil container 18, the selector valve 14 and the hydraulic cylinder 7 are connected to each other by oil pipe 15.

The present invention is provided that the drilling driven shaft 13 is driven to rotate through the driving device by the main motor 8, realizing drilling and tapping; the lift of up and down of the hydraulic cylinder 7 of this machine tool is provided to regulate the lift of the transverse arm sleeve 3, the sliding track 4 and the sliding transverse arm 5. The transverse arm sleeve 3 and the column 1 can rotate relative to each other. By pushing or pilling the sliding transverse arm 5 to slide forward and backward, it realizes the regulation of the distance of the drilling bit; with the rotation of right and left and sliding forward and backward of the sliding transverse arm 5, it realizes the drilling and tapping within an area scale. The lock device 16 and 17 make the transverse arm sleeve fixedly locked with the column 1 and the sliding track 4 with the sliding transverse arm 5. When the drilling or tapping is positioned, turn on the lock device, preventing the swing between the sliding transverse arm and the sliding track and between the transverse arm sleeve with the column to ensure the stability and the accuracy of this machine tool.

As shown in the FIG. 1, the driving device of this machine tool includes a gear driving device, the machine tool is provided with a first gear 24 and a second gear 25 are fixedly disposed in the drilling driven shaft, the second gear 25 is situated below the first gear 24, a gear shaft 28 is disposed on one side of the drilling driven shaft 13, the lower end of the gear shaft 28 is fixedly connected to the second transverse arm 29, the upper end of the gear shaft 28 is fixedly connected to a third second gear 26, the first gear 24 is engaged to the third gear 26, a fourth gear 27 is disposed below the third gear 26, the fourth gear 27 is fixedly connected to the gear shaft 28, the second gear 25 is engaged to the fourth gear 27, the diameter of the first gear 24 is smaller than that of the third gear 26, the diameter of the fourth gear 27 is smaller than that of the second gear 25. The present invention is applied with the engagement of two pairs of gear to realize the reducer to obtain high pulling torque, preventing the slipper of the belt driving.

As figured in the FIG. 1 and FIG. 2, the lock device 16, 17 of the machine tool is hydraulic lock device, which includes an oil pump 9, an oil pipe 15, two hydraulic subsection pumps 20, 22, pressed blocks 19, 21 and a selector valve 14, the pressed block 19, 21 are separately disposed between the transverse arm and the column 1 and between the sliding track 4 and the sliding transverse arm 5, the hydraulic subsection pumps 20, 22 are separately disposed outside the pressed blocks 19, 21, the two hydraulic subsection pumps 20, 22 are separately connected to the oil pump 9 through the oil pipe 15, the selector valve 14 is connected between the oil pump 9 and the hydraulic subsection pumps 20, 22.

The lock device of the present invention 16, 17 is provided. the oil is pressurized through the oil pump 9 by the main motor 8, and the hydraulic subsection pumps 20, 21 are driven by the pressurized oil inside the oil pipe 15. Then the pressed block 19, 21 are pushed by the hydraulic subsection pumps 20, 21 to lock the transverse arm sleeve 3 with the column 1 and the sliding transverse arm 5 with the sliding track 4. the lock is realized by the tightly holding of the pressed blocks with the column 1 and the sliding transverse arm. The lock and release are realized by the selector valve 14.

Industrial Applicability

The present invention is provided with a bench slide drilling and tapping dual purpose machine tool, in which the transverse arm sleeve and the column can rotate relative to each other. By pushing or pilling the sliding transverse arm to slide forward and backward, it realizes the regulation of the distance of the drilling bit; with the rotation of right and left and sliding forward and backward of the sliding transverse arm, it realizes the drilling and tapping within an area scale. the present invention is provided with labor saving, high working efficiency and well industrial applicability.

What is claimed is:

1. A bench slide drilling and tapping dual purpose machine tool, includes a base, a column and a transverse arm sleeve, the column is vertically fixed on the base, the transverse arm sleeve is sleeved around the column, wherein a cylinder body of a hydraulic cylinder arranged coaxially with the column is provided in the center of the column; a bracket is connected to an upper end of the transverse arm sleeve, and the bracket is connected to a top end of the telescopic rod of the hydraulic cylinder; a sliding track is fixedly connected to one side of the transverse arm sleeve, and a sliding transverse arm is provided inside the sliding track, a main motor is provided on one end of the sliding transverse arm, and the other end is fixedly connected with a second transverse arm; a drilling driven shaft is arranged in the second transverse arm; an upper end of the main motor is connected with a main belt wheel, and a driven belt wheel is provided on the top end of the drilling driven shaft; the main belt wheel is connected to the driven belt wheel by a belt, a lock device is disposed between the transverse arm sleeve and the column, a lock device is disposed between the sliding track and the sliding transverse arm.

2. A bench slide drilling and tapping dual purpose machine tool according to the claim 1, wherein further includes a gear driving device, a first gear and a second gear are fixedly disposed in the drilling driven shaft, the second gear is situated below the first gear, a gear shaft is disposed on one side of the drilling driven shaft, a lower end of the gear shaft is fixedly connected to the second transverse arm, an upper end of the gear shaft is fixedly connected to a third gear, the first gear is engaged to the third gear, a fourth gear is disposed below the third gear, the fourth gear is fixedly connected to the gear shaft, the second gear is engaged to the fourth gear, the diameter of the first gear is smaller than that of the third gear, the diameter of the fourth gear is smaller than that of the second gear.

3. A bench slide drilling and tapping dual purpose machine tool according to the claim 1, wherein the lock device includes an oil pump, an oil pipe, two hydraulic subsection pumps, pressed blocks and a selector valve, the pressed blocks are separately disposed between the transverse arm and the column and between the sliding track and the sliding transverse arm, the hydraulic subsection pumps are separately disposed outside the pressed blocks, the two hydraulic subsection pumps are separately connected to the oil pump through the oil pipe, the selector valve is connected between the oil pump and the hydraulic subsection pumps.

4. A bench slide drilling and tapping dual purpose machine tool according to the claim 2, wherein the lower end of the main motor is connected to an oil pump, the input of the oil pump is connected to a oil container, a selector valve is disposed between the oil pump and the hydraulic cylinder, the oil pump, the oil container, the selector valve and the hydraulic cylinder are connected to each other by oil pipes.

5. A bench slide drilling and tapping dual purpose machine tool according to the claim 1, wherein a roller is disposed between the sliding transverse arm and the sliding track.

6. A bench slide drilling and tapping dual purpose machine tool according to the claim 2, wherein a roller is disposed between the sliding transverse arm and the sliding track.

7. A bench slide drilling and tapping dual purpose machine tool according to the claim 3, wherein a roller is disposed between the sliding transverse arm and the sliding track.

* * * * *